(12) United States Patent
Han et al.

(10) Patent No.: US 11,790,494 B2
(45) Date of Patent: Oct. 17, 2023

(54) FACIAL VERIFICATION METHOD AND APPARATUS BASED ON THREE-DIMENSIONAL (3D) IMAGE

(71) Applicant: SAMSUNG ELECTRONICS CO., LTD., Suwon-si (KR)

(72) Inventors: Seungju Han, Seoul (KR); Minsu Ko, Suwon-si (KR); Jaejoon Han, Seoul (KR); Chang Kyu Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/540,307

(22) Filed: Dec. 2, 2021

(65) Prior Publication Data

US 2022/0092295 A1 Mar. 24, 2022

Related U.S. Application Data

(63) Continuation of application No. 16/426,460, filed on May 30, 2019, now Pat. No. 11,200,405.

(30) Foreign Application Priority Data

May 30, 2018 (KR) ........................ 10-2018-0061946

(51) Int. Cl.
*G06K 9/00* (2022.01)
*G06T 5/00* (2006.01)
(Continued)

(52) U.S. Cl.
CPC ................ *G06T 5/005* (2013.01); *G06T 5/50* (2013.01); *G06T 7/73* (2017.01); *G06V 40/165* (2022.01);
(Continued)

(58) Field of Classification Search
CPC ........... G06K 9/00248; G06K 9/00281; G06K 9/00288; G06K 9/036; G06K 9/60;
(Continued)

(56) References Cited

U.S. PATENT DOCUMENTS 7,027,620 B2 4/2006 Martinez
8,406,525 B2 3/2013 Ma et al.
(Continued)

FOREIGN PATENT DOCUMENTS

CN 107909065 A 4/2018
JP 2016-81212 A 5/2016
(Continued)

OTHER PUBLICATIONS

Drira, Hassen, et al., "3D Face Recognition Under Expressions,Occlusions and Pose Variations", *IEEE Transactions on Pattern Analysis and Machine Intelligence*, Jan. 2013, pp. 1-15 (16 pages in English).
(Continued)

*Primary Examiner* — Xin Jia
(74) *Attorney, Agent, or Firm* — NSIP Law

(57) ABSTRACT

A three-dimensional (3D) image-based facial verification method and apparatus is provided. The facial verification method may include capturing a facial image of a 3D face of a user, determining an occluded region in the captured facial image by comparing the captured facial image and an average facial image, generating a synthetic image by synthesizing the captured facial image and the average facial image based on the occluded region, and verifying the user based on the synthetic image.

20 Claims, 12 Drawing Sheets

(51) Int. Cl.
*G06T 7/73* (2017.01)
*G06T 5/50* (2006.01)
*G06V 40/16* (2022.01)

(52) U.S. Cl.
CPC .......... *G06V 40/171* (2022.01); *G06V 40/172* (2022.01); *G06T 2207/10012* (2013.01); *G06T 2207/20216* (2013.01); *G06T 2207/20221* (2013.01); *G06T 2207/30201* (2013.01)

(58) Field of Classification Search
CPC ........ G06K 9/6202; G06T 2207/10012; G06T 2207/20216; G06T 2207/20221; G06T 2207/30201; G06T 5/005; G06T 5/50; G06T 7/73
See application file for complete search history.

(56) References Cited

U.S. PATENT DOCUMENTS

| | | | |
|---|---|---|---|
| 2007/0258645 A1 | 11/2007 | Gokturk et al. | |
| 2015/0199560 A1* | 7/2015 | Gokturk | G06T 7/75 382/195 |
| 2016/0110586 A1* | 4/2016 | Hayasaka | G06V 40/172 382/118 |
| 2016/0379050 A1 | 12/2016 | Tian | |
| 2017/0032179 A1 | 2/2017 | Al-Qunaieer et al. | |
| 2017/0178306 A1 | 6/2017 | Le Clerc et al. | |
| 2017/0180659 A1 | 6/2017 | Levoy et al. | |
| 2017/0344807 A1 | 11/2017 | Jillela et al. | |
| 2018/0005025 A1 | 1/2018 | Ayvaci et al. | |
| 2018/0211097 A1 | 7/2018 | Wang | |
| 2018/0285628 A1* | 10/2018 | Son | G06V 40/167 |
| 2019/0205616 A1* | 7/2019 | Hong | G06V 40/171 |

FOREIGN PATENT DOCUMENTS

| | | |
|---|---|---|
| KR | 10-2008-0104565 A | 12/2008 |
| KR | 10-2011-0069923 A | 6/2011 |
| KR | 10-2012-0113912 A | 10/2012 |
| KR | 10-2013-0098824 A | 9/2013 |
| KR | 10-2015-0122715 A | 11/2015 |
| KR | 10-2018-0030718 A | 3/2018 |

OTHER PUBLICATIONS

Alyuz, Nese, et al., "3-D Face Recognition Under Occlusion Using Masked Projection", *IEEE Transactions on Information Forensics and Security*, May 2013, pp. 789-802, vol. 8, No. 5 (14 pages in English).

Korean Office Action dated Aug. 22, 2023, in counterpart Korean Patent Application No. 10-2018-0061946 (4 pages in English, 7 pages in Korean).

* cited by examiner

FACIAL VERIFICATION METHOD AND APPARATUS BASED ON THREE-DIMENSIONAL (3D) IMAGE

CROSS-REFERENCE TO RELATED APPLICATIONS

This application is a continuation of U.S. patent application Ser. No. 16/426,460 filed on May 30, 2019, which claims the benefit under 35 USC § 119(a) of Korean Patent Application No. 10-2018-0061946 filed on May 30, 2018, in the Korean Intellectual Property Office, the entire disclosure of which is incorporated herein by reference for all purposes.

BACKGROUND

1. Field

The following description relates to a facial verification method and apparatus based on a three-dimensional (3D) image

2. Description of Related Art

Facial verification technology is a type of biometrics-based authentication technology, and may be used to determine whether a user is a valid user based on facial features in a still image or a video. The facial verification technology may verify a target, e.g., a face of a user, without physical contact with the target. Recently, facial verification technology has been used in a wider range of application fields, such as, for example, security systems, mobile verification, and multimedia search, due to its convenience and efficiency.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a facial verification method includes capturing a facial image including a three-dimensional (3D) face of a user, determining an occluded region in the captured facial image by comparing the captured facial image and an average facial image, generating a synthetic image by synthesizing the captured facial image and the average facial image based on the determined occluded region, and verifying the user based on the generated synthetic image.

The determining of the occluded region may include determining the occluded region by comparing pixel values of corresponding pixels in the captured facial image and the average facial image.

The generating of the synthetic image may include determining a replacement region in the average facial image corresponding to the occluded region, and generating the synthetic image by replacing the occluded region in the captured facial image with the determined replacement region.

The facial verification method may include determining at least one of a ratio of the occluded region in the captured facial image and a position of the occluded region in the captured facial image.

The ratio of the occluded region may be determined based on at least one of a ratio of a size of the occluded region to a size of the captured facial image, and a ratio of a number of landmarks included in the occluded region to a number of landmarks included in the captured facial image.

The position of the occluded region may be determined based on positions of landmarks included in the captured facial image.

The verifying of the user may include determining a reliability of the captured facial image based on at least one of the ratio of the occluded region in the captured facial image and the position of the occluded region in the captured facial image, and verifying the user based on the determined reliability of the captured facial image.

The determined reliability of the captured facial image may decrease as the ratio of the occluded region increases and the occluded region is closer to a major facial landmark.

The verifying of the user based on the reliability of the captured facial image may include comparing the reliability of the captured facial image with a threshold value, and extracting features from the captured facial image based on a result of the comparing.

The verifying of the user may include determining the reliability of the captured facial image based on at least one of the ratio of the occluded region and the position of the occluded region, calculating a score to be used to verify the user, and verifying the user by applying, to the score, a weighted value corresponding to the reliability of the captured facial image.

The average facial image may be generated based on an average pixel value of corresponding pixels in 3D faces included in reference images.

The occluded region may include at least one of a region corresponding to an occluding element covering the 3D face of the user in the captured facial image, a region corresponding to a portion of an actual face of the user that is not included in the captured facial image, or a region corresponding to landmarks deviating far from a reference arrangement of landmarks in the captured facial image.

The obtaining of the captured facial image may include receiving an input image including the 3D face of the user, detecting the 3D face of the user from the input image, detecting facial landmarks from the detected 3D face of the user, separating the 3D face of the user from the input image based on the detected facial landmarks, and generating the captured facial image by performing normalization on the separated 3D face of the user based on the detected landmarks.

The verifying of the user may include verifying the user by comparing features extracted from the synthetic image and features extracted from a registered image of the user.

In a general aspect, a facial verification apparatus includes a processor configured to capture a facial image including a three-dimensional (3D) face of a user, determine an occluded region in the captured facial image by comparing the captured facial image and an average facial image, generate a synthetic image by synthesizing the captured facial image and the average facial image based on the determined occluded region, and verify the user based on the generated synthetic image.

The processor may be further configured to determine at least one of a ratio of the occluded region in the captured facial image and a position of the occluded region in the captured facial image.

The processor may be further configured to determine a reliability of the captured facial image based on at least one of the ratio of the occluded region in the captured facial image and the position of the occluded region in the captured facial image, and verify the user based on the determined reliability.

The processor may be further configured to compare the reliability of the captured facial image with a threshold value, and extract features from the captured facial image based on a result of the comparing.

The processor may be further configured to determine the reliability of the captured facial image based on at least one of the ratio of the occluded region and the position of the occluded region, calculate a score to be used to verify the user, and verify the user by applying, to the score, a weighted value corresponding to the reliability of the captured facial image.

In a general aspect a facial verification method includes capturing a facial image of a user, comparing pixel values in the captured facial image with corresponding pixel values in an average facial image, determining one of a first occlusion region of a first occlusion type and a second occlusion region of a second occlusion type based on a result of the comparing, generating a synthetic image by synthetizing the captured facial image and the average facial image based on the determined first occlusion region or second occlusion region, and verifying the validity of the user based on the generated synthetic image.

The method may further include determining a third occlusion region of a third occlusion type by comparing a deviation between facial landmarks in the captured facial image and corresponding facial landmarks in the average facial image.

The deviation may indicate that a difference between positions of the facial landmarks in the captured facial image and positions of facial landmarks in the average facial image is greater than a preset threshold.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, ratios, and depiction of elements in the drawings may be exaggerated for clarity, illustration, and convenience.

DETAILED DESCRIPTION

Figure 1:
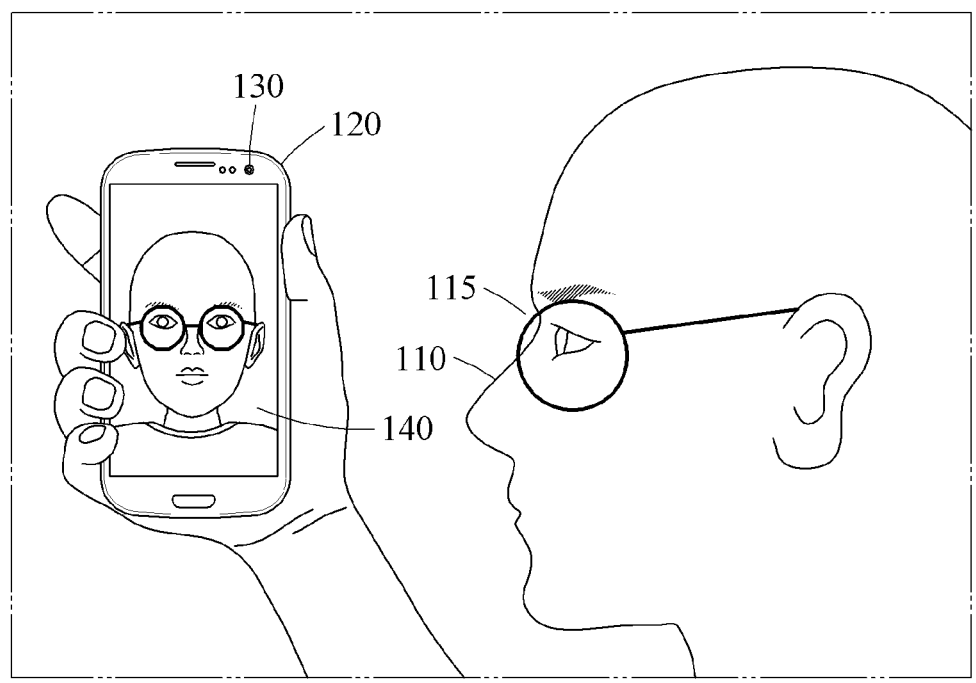
FIG. 1 is a diagram illustrating an example of facial verification in accordance with one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

FIG. 1 is a diagram illustrating an example of facial verification in accordance with one or more embodiments.

Facial verification is a verification method used to determine whether a user is a valid user or not based on a face of the user when the user attempts to use his/her face to perform facial verification when, for example, unlocking a device, logging into a device of the user, performing payment services, and performing access control operations.

Referring to FIG. 1, a user 110 may attempt facial verification through an electronic apparatus 120. Examples of the electronic apparatus 120 include, but are not limited to, a smartphone, a wearable device, a tablet computer, a netbook, a laptop computer, a desktop computer, a personal digital assistant (PDA), a set-top box, a home appliance, a biometrics-based door lock, a security device, and a vehicle start device.

A facial verification apparatus may be embodied as at least a portion of the electronic apparatus 120, and the facial verification apparatus may perform facial verification on the user 110 when the user 110 attempts to gain access to the electronic apparatus 120. In the illustrated example, the facial verification apparatus obtains an input image 140 through a camera 130, and determines whether to unlock the electronic apparatus 120, or perform various authentication functions, by analyzing the input image 140. When the facial verification is successful, the user 110 may successfully unlock the electronic apparatus 120. Conversely, when the facial verification is unsuccessful, the user 110 may not unlock the electronic apparatus 120, and the electronic apparatus 120 may then continue operating in a locked state.

In an example, a three-dimensional (3D) image may be used for facial verification. In the illustrated example, the camera 130 may generate a 3D image through various methods, and the generated 3D image may be provided to the facial verification apparatus as the input image 140. Herein, a 3D image may include depth information of objects included in the 3D image. The camera 130 may be a 3D imaging device configured to generate a 3D image through a time-of-flight (ToF) method or a structured light method, or a 3D imaging device configured to generate a 3D image through a plurality of two-dimensional (2D) images, such as, for example, a stereo camera and three or more multi-view 2D cameras. A 2D image may include, for example, a color image, a black-and-white image, and an infrared image. The camera 130 may also generate a 3D image through various methods, and thus types or operations of the camera 130 are not limited to the examples described in the foregoing.

The facial verification apparatus extracts a facial feature from the input image 140 with a feature extractor, and determines whether the facial verification is successful or unsuccessful based on a result of comparing the extracted facial feature and a feature registered in advance in a facial registration process. The feature extractor may be implemented in hardware and may be a model that outputs feature information, such as, a feature vector value or a probability value, or a feature map based on input information, and the model may be, for example, a neural network model that is trained by training data.

The neural network may be a deep neural network (DNN), as a non-limiting example. In such an example, the DNN may be one or more of a fully connected network, a deep convolutional network, and/or a recurrent neural network, or may include different or overlapping neural network portions respectively with such full, convolutional, or recurrent connections. The neural network may be configured to perform, as non-limiting examples, object classification, object recognition, and image recognition by mutually mapping input data and output data in a nonlinear relationship based on deep learning. Such deep learning is indicative of processor implemented machine learning schemes for solving issues, such as issues related to facial recognition from a big data set, as a non-limiting example. The deep learning may be implemented by mapping of input data and the output data through supervised or unsupervised learning or training, such that when trained the resultant machine learning model, engine, or example NN may intuitively map further input data to output data with a desired accuracy or reliability. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

For example, the user 110 may capture an image of a face of the user 110 with the camera 130 to attempt facial verification. In this example, as illustrated in FIG. 1, the obtained facial image may include an occlusion due to an occluding element, for example, eyeglasses 115. Herein, the facial image may indicate a region in the input image 140 corresponding to the face of the user 110. The occlusion may be indicated as various types, in addition to the occluding element such as the eyeglasses 115, and the types of occlusion will be described with reference to FIG. 2.

Such an occlusion in the facial image may be a hindrance to accurate determination of results of facial verification. The facial verification may be performed based on unique features of the user 110 included in the facial image, and such unique features of the user 110 may not be extracted because of the occlusion. In the illustrated example, when the user 110 performs a facial registration process without wearing the eyeglasses 115, and then performs a facial verification process while wearing the eyeglasses 115, a false result may occur due to the presence of the eyeglasses 115.

According to an example, a recognition rate of facial verification may be improved by performing a facial verification method that is robust against, or less sensitive to, the presence of an occlusion, such as, for example, the eyeglasses 115 as illustrated in FIG. 1.

In an example, the facial verification apparatus may determine an occluded region in the facial image by comparing a 3D facial image and an average 3D facial image or a target 3D facial image, and may perform facial verification with an effect of the occluded region being removed from the 3D facial image. For example, the facial verification apparatus may generate a synthetic image by determining a replacement region in the average 3D facial image corresponding to the occluded region in the 3D facial image, and replacing the occluded region in the 3D facial image with the replacement region. For example, the facial verification apparatus may replace pixel values of pixels in the occluded region with pixel values of pixels in the replacement region. The facial verification apparatus may perform facial verification by extracting facial features from the synthetic image in lieu of the 3D facial image. In an example in which input data is recognized through a recognizer, the input data may be normalized based on an average value, and the normalized input data may be input to the recognizer. In terms of such an operation of the recognizer, the replacing of the occluded region with the replacement region may be construed that the occluded region, as noise, is removed from the facial image.

Additionally, when the occluded region is determined in the 3D facial image, the facial verification apparatus may determine a reliability of the 3D facial image based on the occluded region, and apply the determined reliability of the 3D facial image to a facial verification process. The reliability of the 3D facial image may indicate how reliable the facial verification process is when it is performed with the 3D facial image. The reliability of the 3D facial image may be determined based on at least one of a ratio of the occluded region in the 3D facial image or a position of the occluded region in the 3D facial image. For example, in an example in which a size of an area occluded by the occluded region in the 3D facial image is large, or a major facial landmark is occluded by the occluded region, the reliability of the 3D facial image may be determined to be low. In response to the reliability of the 3D facial image being determined to be low, the facial verification apparatus may determine the facial verification performed using the 3D facial image to be unsuccessful, or may set a low matching score based on the 3D facial image.

Figure 2:
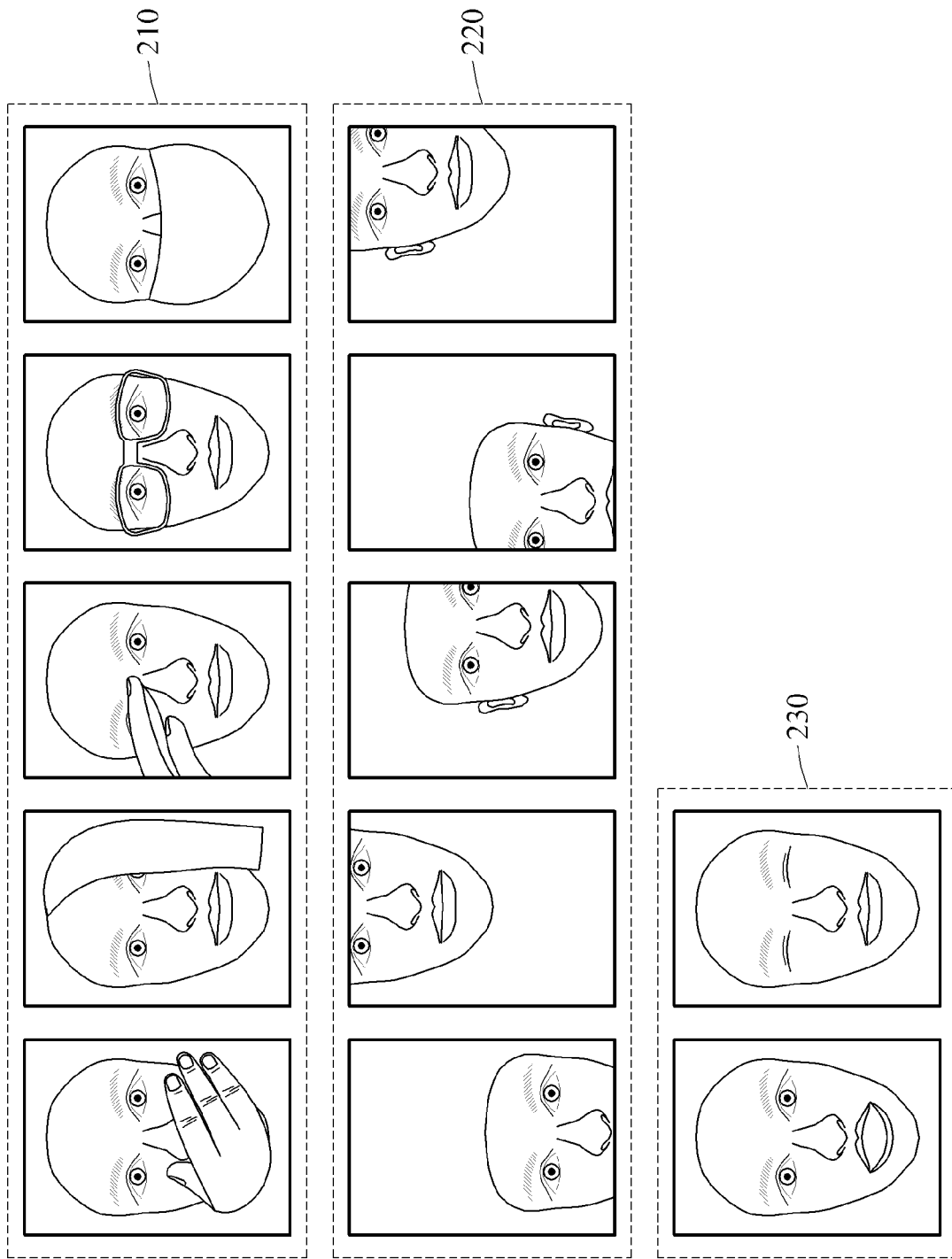
FIG. 2 is a diagram illustrating examples of types of occlusion in a facial image in accordance with one or more embodiments.

FIG. 2 is a diagram illustrating examples of types of occlusion in a facial image.

Referring to FIG. 2, types of occlusion may include a first occlusion type 210, which may be caused by an occluding element, a second occlusion type 220, which may be caused by a viewing angle of a camera, and a third occlusion type occlusion 230, which may be caused by an arrangement of facial landmarks. However, the types of occlusions are not limited to the example types described in the foregoing, and thus there are other types of occlusion based on various elements that hinder facial recognition, for example, a hat, a scarf, or a mask.

An occlusion may be a hindrance to the determination of a facial feature of a user, and a region in which a facial feature of the user is not verifiable or recognizable, or is difficult to be verified due to such an occlusion, is referred to as an occluded region. An occluded region of the first occlusion type 210 may be a region in a facial image of the user corresponding to an occluding element that covers at least a portion of a 3D face of the user. An occluded region of the second occlusion type 220 may be a region corresponding to a portion of an actual face of the user that is not shown in the facial image of the user. Herein, an occlusion region may not be necessarily shown in a facial image, and such a portion that is not shown in the facial image may also be included in the second occlusion type 220.

An occluded region of the third occlusion type 230 may be a region corresponding to facial landmarks deviating far from a reference arrangement of facial landmarks in the facial image. For example, the reference arrangement of facial landmarks may be defined based on an arrangement of facial landmarks corresponding to an expressionless face of the user. In this example, the third occlusion type 230 may occur due to a change in facial expression of the user. For example, when the user yawns and the mouth of the user is wide open, and when eyes of the user are closed, such changes may be included in the third occlusion type 230. The deviating of some landmarks far from the reference arrangement may indicate that a difference between positions of the landmarks in the captured facial image and positions of the landmarks in the reference arrangement is greater than a preset threshold value, for example, the open mouth, or less than the threshold value, for example, the closed eyes.

In an example in which at least one type of occlusion among these three types of occlusion is shown in a facial image, a facial verification apparatus may perform a process suitable for the type of occlusion in the facial image to perform facial verification.

Figure 3:
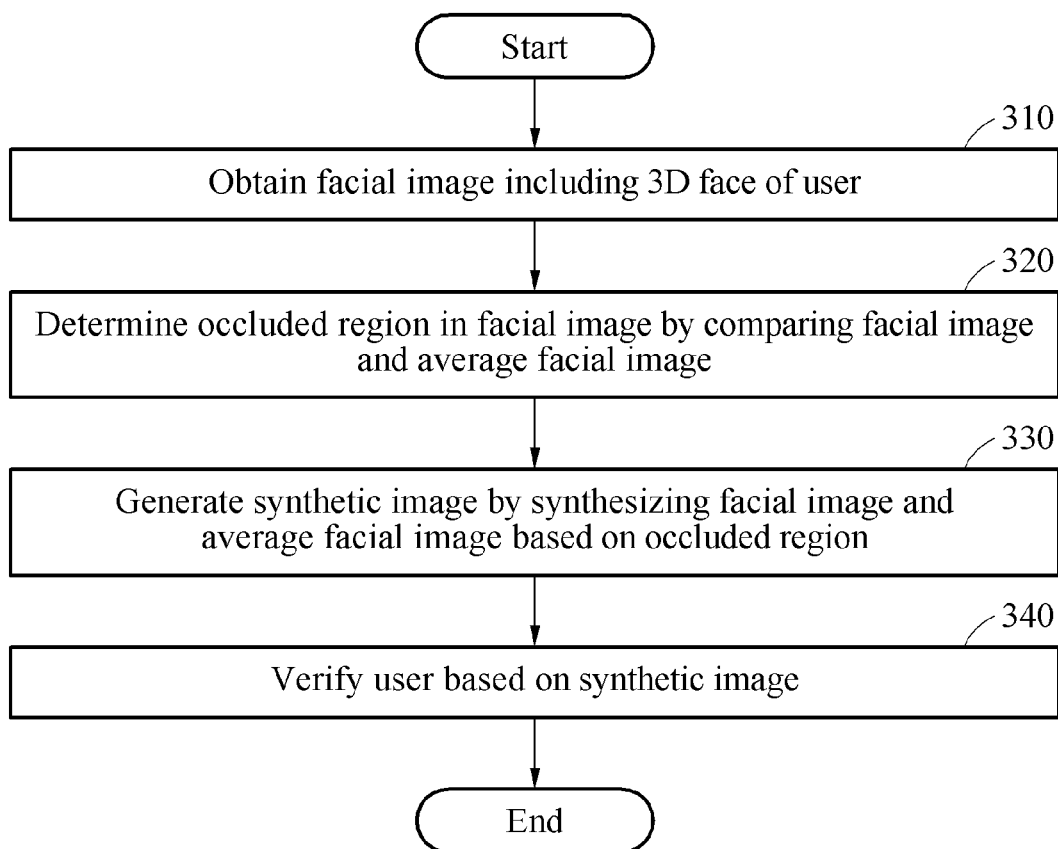
FIG. 3 is a flowchart illustrating an example of a facial verification method in accordance with one or more embodiments.

FIG. 3 is a flowchart illustrating an example of a facial verification method. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer that perform the specified functions, or combinations of special purpose hardware and computer instructions. In addition to the description of FIG. 3 below, the descriptions of FIGS. 1-2 are also applicable to FIG. 3, and are incorporated herein by reference. Thus, the above description may not be repeated here.

Referring to FIG. 3, in operation 310, a facial verification apparatus obtains a facial image of a 3D face of a user. In an example, the facial image may be obtained by separating, from an input image, the 3D face of the user included in the input image, and normalizing the separated 3D face. The facial verification apparatus may obtain the facial image through a series of processes performed on the input image.

In operation 320, the facial verification apparatus determines an occluded region in the facial image by comparing the facial image and an average facial image.

The average facial image used herein may include an average 3D face of various users, and may include reference images including 3D faces of various users. For example, the reference images may correspond to training data, and may be configured to include minimal occlusions. The average facial image may be generated based on an average value of corresponding pixels in the 3D faces in the reference images. The 3D faces in the reference images may be separated from the reference images and normalized, respectively. The average facial image corresponding to an average face of the users may be generated based on an average value of corresponding pixels in the separated and normalized 3D faces. Herein, the corresponding pixels may be pixels positioned in the same coordinates in corresponding images.

In an example, the facial verification apparatus may determine an occluded region by comparing pixel values of corresponding pixels in the facial image and pixel values of corresponding pixels in the average facial image. This example may be used to detect a first occlusion type and a second occlusion type that are described above with reference to FIG. 2.

Herein, a pixel value of a pixel in a 3D image may include depth information. For example, a portion of the 3D image in which a difference between a pixel value of a pixel in the facial image and a pixel value of a pixel in the average facial image is great, this portion of the 3D image may correspond to a portion with a great difference in depth. Thus, such a portion of the 3D image with the great difference between the pixel values of the facial image and the average facial image may be determined to be an occluded region. This occluded region in this example may correspond to a first occlusion type described above with reference to FIG. 2.

Additionally, in an example of a region in the facial image in which there is no pixel corresponding to a pixel in the average facial image, this region may correspond to a second occlusion type described above with reference to FIG. 2. For example, the facial image may be an image to which separation and normalization are applied. In this example, a portion in an actual face of the user that is not captured due to a viewing angle of a camera may not have a pixel value. Thus, when there is a region in which no pixel value of the facial image is found through the comparing of pixel values of corresponding pixels in the captured facial image and the average facial image, this region may be determined to be an occluded region.

In another example, the facial verification apparatus may determine an occluded region by comparing a reference arrangement and an arrangement of facial landmarks in the facial image. This example may be used to detect a third occlusion type described above with reference to FIG. 2.

As described above with reference to FIG. 2, the reference arrangement of facial landmarks may be defined based on an arrangement of facial landmarks corresponding to an expressionless face of the user. Thus, when there are landmarks that correspond to a face with a mouth wide open or a face with eyes closed and thus deviate greatly from the reference arrangement of landmarks in the expressionless facial image, the facial verification apparatus may determine a region corresponding to the facial landmarks to be an occluded region. The deviating of some facial landmarks from the reference arrangement may indicate that a difference between positions of the facial landmarks and positions of the landmarks in the reference arrangement is greater than a preset threshold value, for example, as in case in which the mouth is open, or less than the threshold value, for example, as in a case in which the eyes are closed.

For example, in an example in which a distance between a landmark indicating an upper portion of the mouth and a landmark indicating a lower portion of the mouth is greater than the threshold value used to determine whether the mouth is open or not, a region corresponding to the landmarks indicating the mouth may be determined to be an occluded region. For another example, in an example in which a distance between a landmark indicating an upper portion of the eyes and a landmark indicating a lower portion of the eyes is less than the threshold value used to determine whether the eyes are closed, a region corresponding to the landmarks indicating the eyes may be determined to be an occluded region.

In operation 330, the facial verification apparatus generates a synthetic image by synthesizing the facial image and the average facial image based on the occluded region. The facial verification apparatus generates the synthetic image by determining a replacement region in the average facial image corresponding to the occluded region in the captured facial image, and replacing the occluded region in the captured facial image with the replacement region.

In operation 340, the facial verification apparatus verifies the validity of the user based on the generated synthetic image.

In a facial registration process, a user may capture an image of a face of the user to register the user as a valid user. The image captured in the facial registration process may also be referred to as a registered image. Herein, a feature extractor may extract features from the registered image and store the extracted features in a database. The features stored in the database in the facial registration process may also be referred to as registered features. The feature extractor may be a model configured to output feature information, such as, for example, a feature vector value and a probability value, based on input information, and the model may be, for example, a neural network model trained by training data.

In a facial verification process, the facial verification apparatus may extract features from a synthetic image with the feature extractor. The features extracted from the synthetic image in the facial verification process may also be referred to as facial features. The facial verification apparatus may determine whether facial verification is successful or unsuccessful by comparing the registered features and the captured facial features. The facial verification apparatus may compare the registered features and the captured facial features with a recognizer, and obtain a result of the comparing. The recognizer may be a model configured to output recognition information, such as, for example, a probability value, based on input information, and the model may be, for example, a neural network model trained by training data. Herein, the facial features may be extracted from the synthetic image which includes an average facial image, instead of a facial image which includes an occluded region, and thus an effect of occlusion may be removed in a feature matching process.

Figure 4:
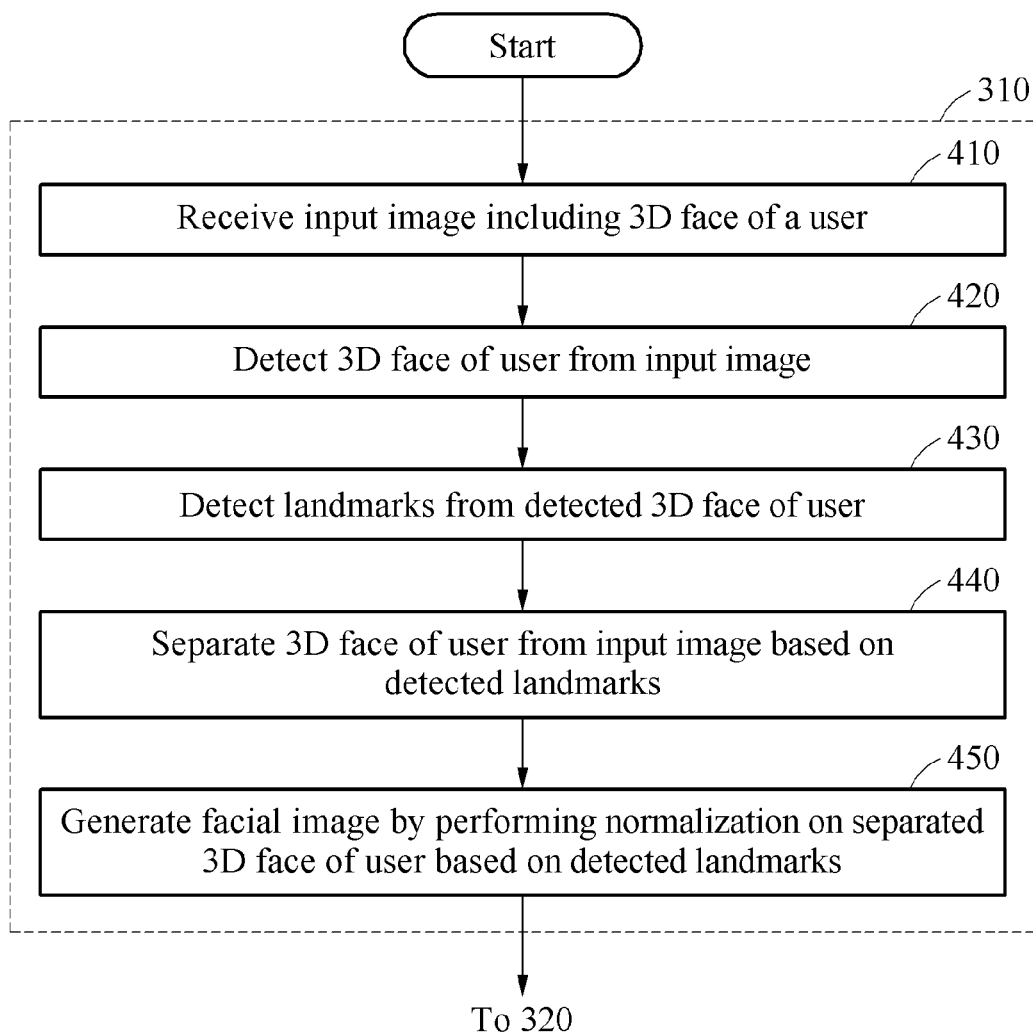
FIG. 4 is a flowchart illustrating an example of a method of obtaining a facial image in accordance with one or more embodiments.

FIG. 4 is a flowchart illustrating an example of a method of obtaining a facial image. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer that perform the specified functions, or combinations of special purpose hardware and computer instructions. In addition to the description of FIG. 4 below, the descriptions of FIGS. 1-3 are also applicable to FIG. 4, and are incorporated herein by reference. Thus, the above description may not be repeated here. Operations 410 through 450 to be described hereinafter with reference to FIG. 4 may be included in operation 310 described above with reference to FIG. 3.

Referring to FIG. 4, in operation 410, a facial verification apparatus receives an input image including a 3D face of a user. The input image may be generated by a camera and then provided to the facial verification apparatus.

In operation 420, the facial verification apparatus detects the 3D face of the user from the input image. For example, the facial verification apparatus may detect a facial region using a Haar-based cascade AdaBoost classifier or a Viola-Jones detector. However, examples are not limited to the example described in the foregoing, and other methods of detecting the facial region may be implemented. Accordingly, the facial verification apparatus may detect the 3D face of the user from the input image based on various methods or schemes to detect the facial region. The detecting of the 3D face of the user from the input image may include detecting the facial region corresponding to the 3D face of the user from the input image. In such an example, operations performed with respect to the 3D face detected from the input image may be construed as being operations performed with respect to the facial region detected from the input image.

In operation 430, the facial verification apparatus detects landmarks from the detected 3D face of the user. For example, the facial verification apparatus may detect facial landmarks from the facial region using a landmark detection method based on an active contour model (ACM), an active shape model (ASM), an active appearance model (AAM), a supervised descent method (SDM), or a neural network model. However, examples are not limited to the example described in the foregoing, and thus the facial verification apparatus may detect facial landmarks using various methods or schemes to detect landmarks. Herein, facial landmarks may be feature points that correspond to major facial parts, for example, eyebrows, eyes, a nose, lips, a chin, ears, hair, and a contour of a face, and are used to identify the facial parts.

In operation 440, the facial verification apparatus separates the 3D face of the user from the input image based on the detected landmarks. The separating of the 3D face of the user from the input image may be performed to remove unnecessary information for facial verification. Through this separating process, a background image or features such as hair may be removed from the input image.

In operation 450, the facial verification apparatus generates a facial image of the user by performing normalization on the separated 3D face of the user based on the detected landmarks. Herein, such a facial normalization process may be performed to adjust landmarks in an image to a predetermined standard through an affine transformation or image scaling. The facial normalization process may also be construed as being a facial alignment process.

Although not illustrated, the facial verification apparatus may generate the facial image by additionally preprocessing the input image. Such a preprocessing may include one or more processes to process the input image to be more suitable for facial verification. For example, the preprocessing may include, for example, adjusting a size of an image, rotating an image, removing noise included in an image, adjusting a contrast of an image, deblurring an image, removing a background region, performing warping to correct a distortion included in an image, cropping a region from an image, and performing binarization on an image.

Figure 5:
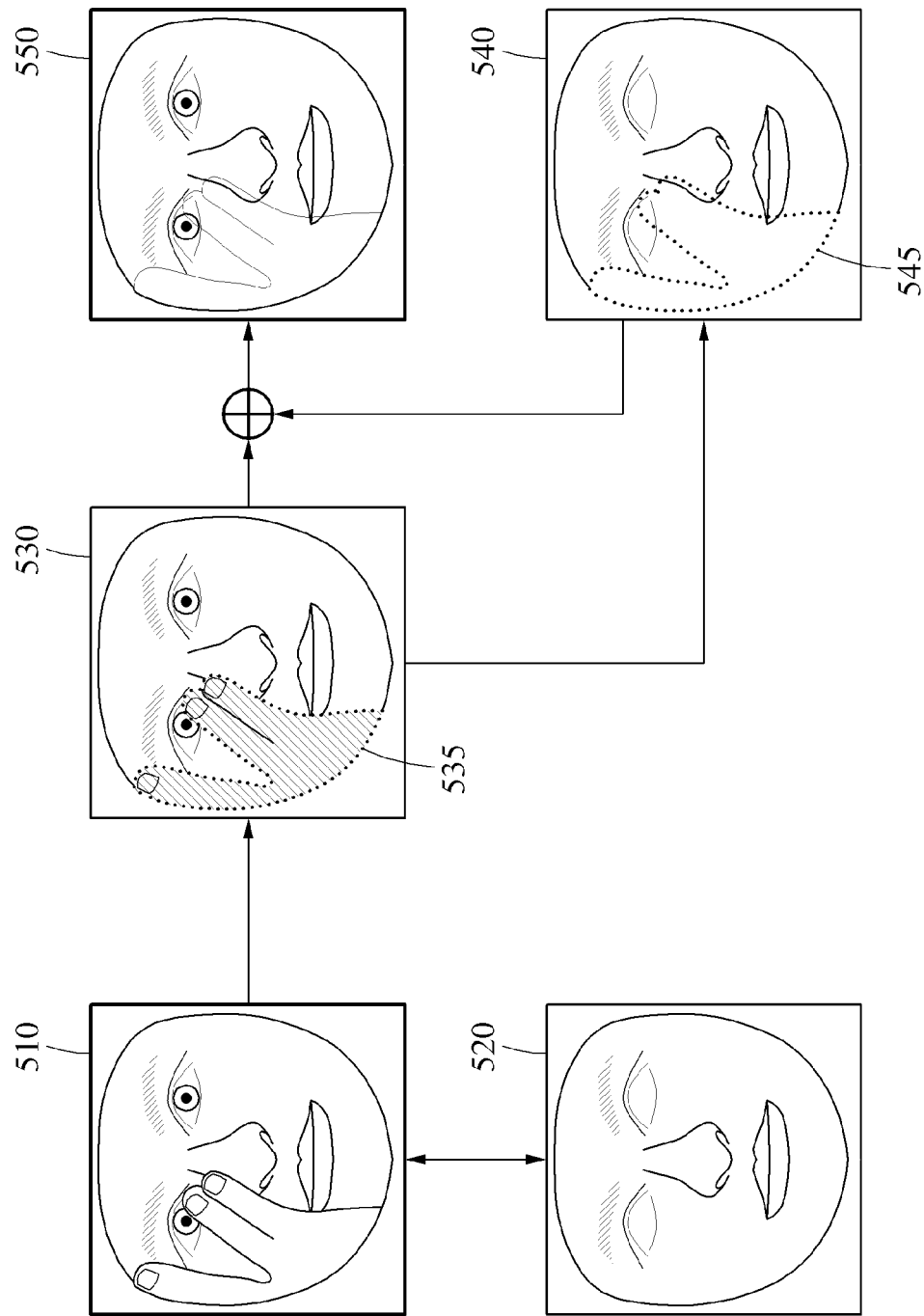
FIG. 5 is a diagram illustrating an example of the generation of a synthetic image in accordance with one or more embodiments.

FIG. 5 is a diagram illustrating an example of how a synthetic image is generated.

Referring to FIG. 5, a facial verification apparatus compares a captured facial image 510 and an average facial image 520, and determines an occluded region 535 in the captured facial image 530. In this example of FIG. 5, the facial image 510 and the facial image 530 may be the same image. The facial verification apparatus determines a replacement region 545 in an average facial image 540 corresponding to the occluded region 535. In this example of FIG. 5, the average facial image 520 and the average facial image 540 may be the same image. The facial verification apparatus replaces the occluded region 535 in the captured facial image 530 with the replacement region 545 to generate a synthetic image 550.

Figure 6:
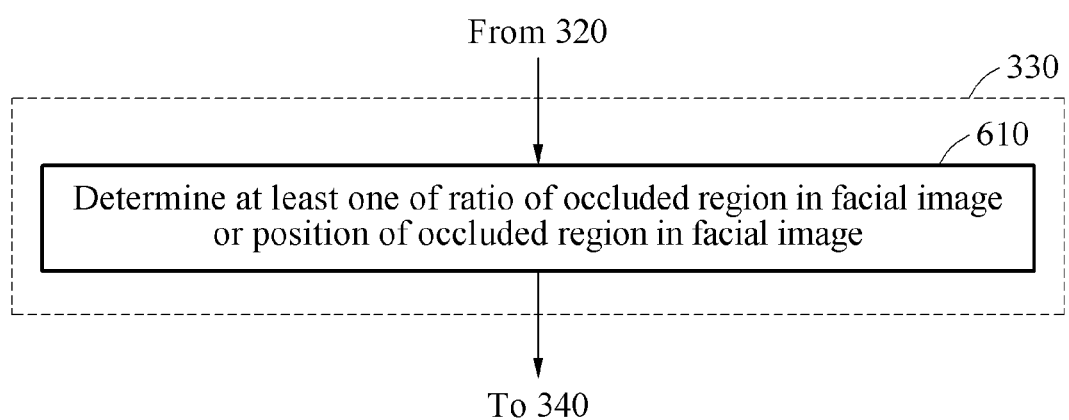
FIG. 6 is a flowchart illustrating an example of a method of determining a ratio and/or a position of an occluded region in accordance with one or more embodiments.

FIG. 6 is a flowchart illustrating an example of a method of determining a ratio and/or a position of an occluded region. Operation 610 to be described hereinafter with reference to FIG. 4 may be included in operation 330 described above with reference to FIG. 3.

Referring to FIG. 6, in operation 610, a facial verification apparatus determines at least one of a ratio of an occluded region in a facial image of a user or a position of the occluded region in the facial image. Although described hereinafter, a reliability of the facial image may be determined based on the determined at least one of the ratio of the occluded region or the position of the occluded region, and a decision whether to verify the user may be determined based on the determined reliability. For example, in at least one of an example in which the ratio of the occluded region in the facial image is high, or an example in which the occluded region is positioned in major landmarks in the facial image, it is highly likely that facial verification performed using the facial image is unsuccessful.

The facial verification apparatus may determine the ratio of the occluded region based on a first ratio which is a ratio of a size of the occluded region to a size of the facial image, or a second ratio which is a ratio of the number of landmarks included in the occluded region to the number of landmarks included in the facial image. For example, in an example in which the size of the facial image is 100 and the size of the occluded region is 30, the first ratio may be determined to be 30%. For another example, in an example in which the number of the landmarks included in the facial image is 50 and the number of the landmarks included in the occluded region is 10, the second ratio may be determined to be 20%.

The facial verification apparatus may determine the ratio of the occluded region based on both the first ratio and the second ratio. In such an example, the first ratio and the second ratio may be integrated into a single value based on a preset rate. For example, the first ratio and the second ratio may be integrated by a same rate, or integrated with a weighted value that is applied to one of the first ratio and the second ratio.

The facial verification apparatus may determine the position of the occluded region based on positions of the landmarks included in the facial image. For example, the position of the occluded region may be determined based on a distance between the occluded region and the positions of the landmarks included in the facial image. In an example in which the occluded region includes landmarks, the position of the occluded region may be determined by comparing positions of the landmarks included in the occluded region and the positions of the landmarks included in the facial image.

Herein, positions of landmarks may be classified by facial parts indicated by the landmarks, for example, eyebrows, eyes, a nose, a chin, ears, hair, a contour of a face, and the like. The position of the occluded region may be determined based on which facial part the landmarks included in the occluded region belong to. For example, the occluded region may be determined to be present in a position of eyes, a position of a nose, a position of lips, or two or more of these positions or a position around one or more of these positions. In addition, which landmark and an amount that each of the landmarks are covered by the occluded region may be determined. Examples of a ratio of an occluded region and a position of an occluded region will be described hereinafter with reference to FIGS. 7 and 8.

Figure 7:
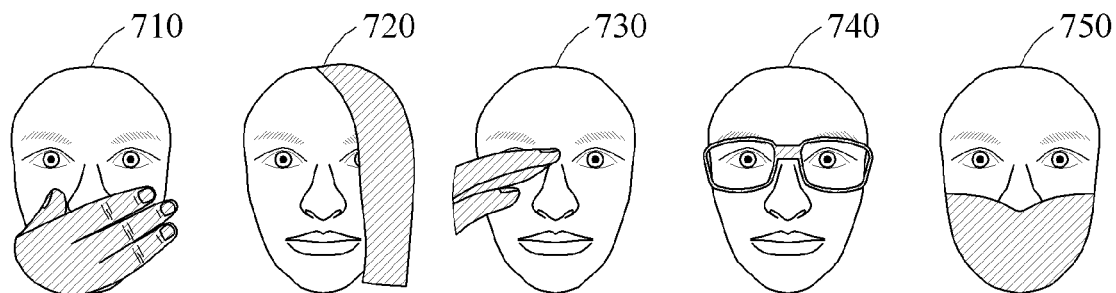
FIG. 7 is a diagram illustrating examples of a ratio of an occluded region in accordance with one or more embodiments.

FIG. 7 is a diagram illustrating examples of a ratio of an occluded region to a non-occluded region. Referring to FIG. 7, a ratio of an occluded region in facial images 710 and 720 is 25%, a ratio of an occluded region in a facial image 730 is 20%, a ratio of an occluded region in a facial image 740 is 8%, and a ratio of an occluded region in a facial image 750 is 60%.

Figure 8:
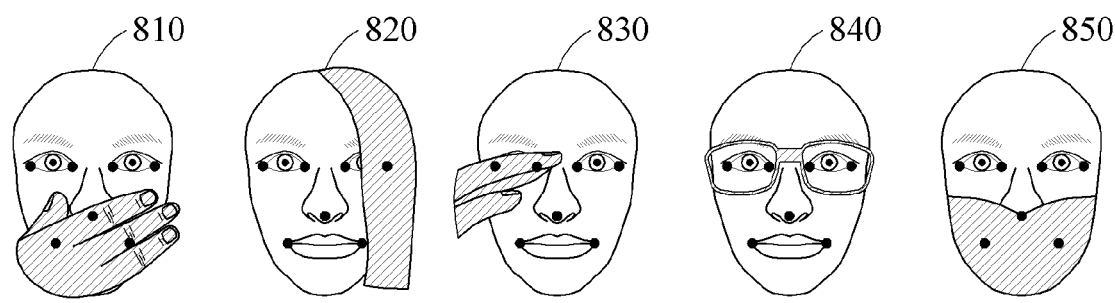
FIG. 8 is a diagram illustrating examples of a position of an occluded region in accordance with one or more embodiments.

FIG. 8 is a diagram illustrating examples of a position of an occluded region. Referring to FIG. 8, an occluded region covers an entire lip portion in a facial image 810, an occluded region covers a portion of a left eye in a facial image 820, an occluded region covers an entire right eye in a facial image 830, an occluded region covers a portion around the eyes in a facial image 840, and an occluded region covers an entire lip portion in a facial image 850.

Figure 9:
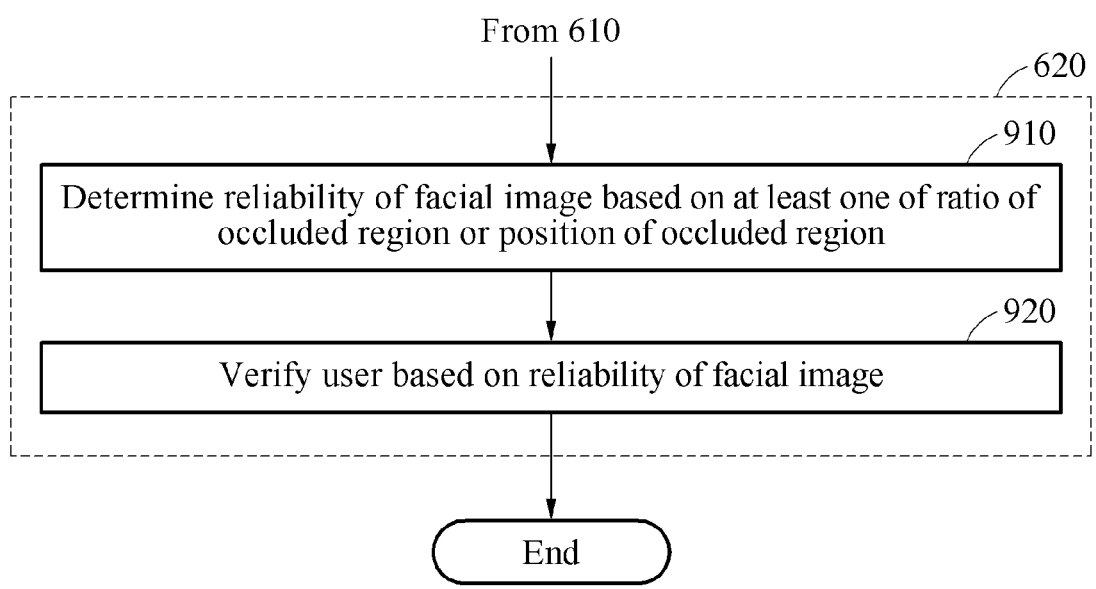
FIG. 9 is a flowchart illustrating an example of a method of determining a reliability of a facial image in accordance with one or more embodiments.

FIG. 9 is a flowchart illustrating an example of a method of determining a reliability of a facial image. The operations in FIG. 9 may be performed in the sequence and manner as shown, although the order of some operations may be changed or some of the operations omitted without departing from the spirit and scope of the illustrative examples described. Many of the operations shown in FIG. 9 may be performed in parallel or concurrently. One or more blocks of FIG. 9, and combinations of the blocks, can be implemented by special purpose hardware-based computer that perform the specified functions, or combinations of special purpose hardware and computer instructions. In addition to the description of FIG. 9 below, the descriptions of FIGS. 1-8 are also applicable to FIG. 9, and are incorporated herein by reference. Thus, the above description may not be repeated here.

Referring to FIG. 9, in operation 910, a facial verification apparatus determines a reliability of a facial image of a user based on at least one of a ratio of an occluded region to a non-occluded in the facial image, or a position of the occluded region in the facial image. Herein, a reliability of a facial image indicates how reliable a verification or authentication process performed using the facial image is. For example, when the ratio of the occluded region is greater, and the occluded region is closer to a major landmark, the reliability of the facial image may be determined to be lower. In an example, a portion with less changes in the facial image may have a higher importance. For example, a greater importance may be set to landmarks corresponding to a nose, landmarks corresponding to eyes, and landmarks corresponding to a mouth, in sequential order. This is because the portion with less change in facial may have a higher verification reliability.

In operation 920, the facial verification apparatus may verify the user based on the determined reliability of the facial image. The reliability of the facial image may be applied to at least one of a feature extracting process, or a matching process to match captured facial features and registered facial features. For example, in response to the reliability of the facial image being less than a preset threshold value, facial verification performed using the facial image may be processed to be unsuccessful before the feature extracting process is performed on the facial image, and a facial verification process may then be immediately terminated. Additionally, when a matching score is calculated through the matching process to match the captured facial features and the registered facial features, the reliability of the facial image may be applied as a weighted value to the obtained matching score.

Figure 10:
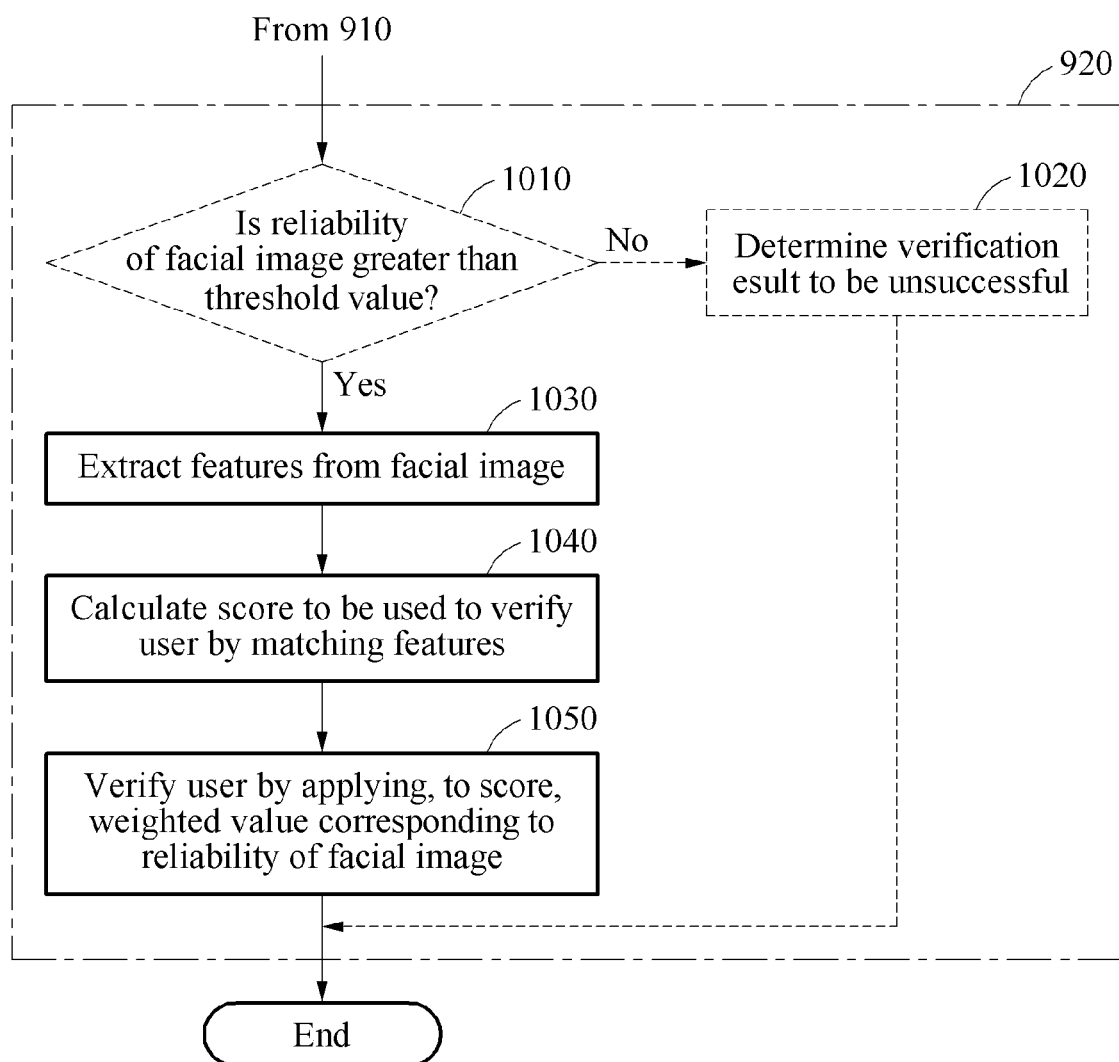
FIG. 10 is a flowchart illustrating an example of a facial verification method performed based on a reliability of a facial image in accordance with one or more embodiments.

FIG. 10 is a flowchart illustrating an example of a facial verification method performed based on a reliability of a facial image. The operations in FIG. 10 may be performed in the sequence and manner as shown, although the order of some operations may be changed or some of the operations omitted without departing from the spirit and scope of the illustrative examples described. Many of the operations shown in FIG. 10 may be performed in parallel or concurrently. One or more blocks of FIG. 10, and combinations of the blocks, can be implemented by special purpose hardware-based computer that perform the specified functions, or combinations of special purpose hardware and computer instructions. In addition to the description of FIG. 10 below, the descriptions of FIGS. 1-9 are also applicable to FIG. 10, and are incorporated herein by reference. Thus, the above description may not be repeated here. Operations 1010 through 1050 to be described hereinafter with reference to FIG. 10 may be included in operation 920 described above with reference to FIG. 9.

Referring to FIG. 10, in operation 1010, a facial verification apparatus compares a reliability of a facial image of a user and a threshold value. In operation 1020, in response to the reliability of the facial image being less than the threshold value, the facial verification apparatus determines a result of facial verification to be unsuccessful and terminates a facial verification process. Operations 1010 and 1020 may be selectively performed according to an example. When operations 1010 and 1020 are not performed, operation 1030 may be performed after operation 910 described above with reference to FIG. 9 is performed.

In operation 1030, in response to the reliability of the facial image being greater than the threshold value, the facial verification apparatus extracts features, or facial features, from the facial image. In this operation 1030, a feature extractor may be used.

In operation 1040, the facial verification apparatus matches features and calculates a score to be used to verify the user. In this operation, the matching may be performed on the facial features extracted in operation 1030 and registered features stored in advance in a facial registration process. In response to a high matching rate, the score may be determined to be high. Conversely, in response to a low matching rate, the score may be determined to be low. In this operation 1040, a recognizer may be used.

In operation 1050, the facial verification apparatus verifies the user by applying, to the score, a weighted value corresponding to the reliability of the facial image. The weighted value may be determined to be proportional to the reliability of the facial image. In an example in which the reliability of the facial image is low despite a high score, the facial verification may be deemed to be unsuccessful.

For example, in an example in which a ratio of an occluded region to a non-occluded is greater than or equal to 50%, the reliability may be determined to be 0. In an example in which the ratio of the occluded region to the non-occluded region is less than 50%, the reliability may be determined to be 1. In this example, when the threshold value is between 0 and 1 and the reliability is 0, features may not be extracted from the facial image and the facial verification process may be terminated. In this example, when the reliability is 1, features may be extracted from the facial image and the score of the recognizer may be used.

In another example, in an example in which a ratio of an occluded region to a non-occluded region is greater than or equal to 70%, the reliability may be determined to be 0. In an example in which the ratio of the occluded region to the non-occluded region is greater than or equal to 30% and less than 70%, the reliability may be determined to be 0.8. In an example in which the ratio of the occluded region to the non-occluded region is less than 30%, the reliability may be determined to be 1. In this example, when the threshold value is between 0 and 0.8 and the reliability is 0, features may not be extracted from the facial image and the facial verification process may be terminated. However, when the reliability is 0.8 or 1, features may be extracted from the facial image and the reliability may be applied as a weighted value to the score of the recognizer.

Figure 11:
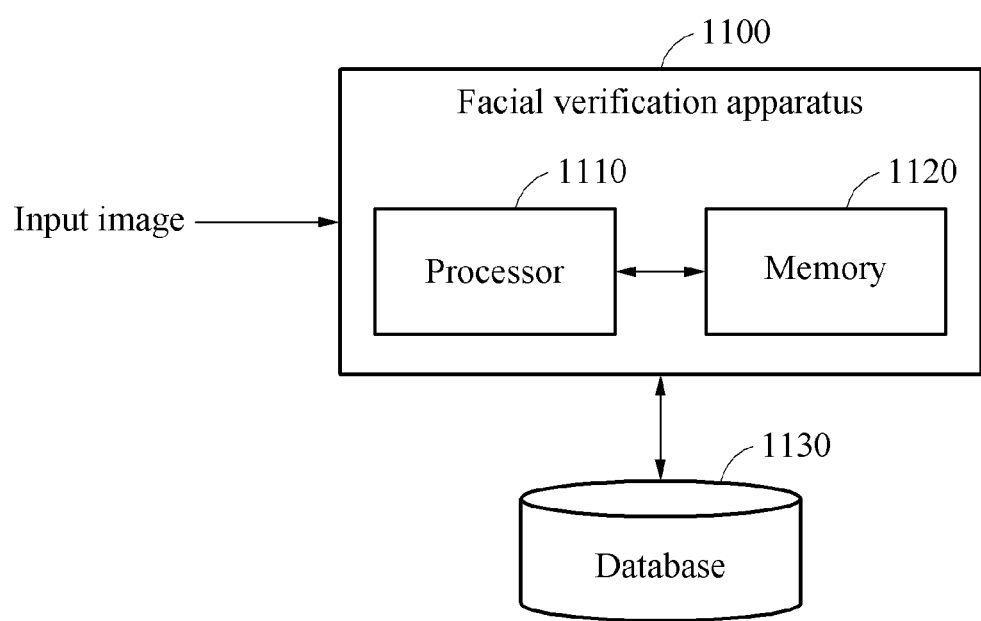
FIG. 11 is a diagram illustrating an example of a facial verification apparatus in accordance with one or more embodiments.

FIG. 11 is a diagram illustrating an example of a facial verification apparatus.

Referring to FIG. 11, a facial verification apparatus 1100 receives an input image for facial verification. The facial verification apparatus 1100 determines whether the facial verification is successful or unsuccessful based on a result of comparing facial features extracted from the input image and registered facial features stored in advance in a database 1130. A valid user may register in advance a face of the user in a facial registration process, and information on the registered face may be stored in the database 1130.

The facial verification apparatus 1100 is configured to perform any one or any combination of any two or more of the operations of the facial verification method described herein, and provide a user with a result of facial verification. The facial verification apparatus 1100 may include at least one processor 1110 and memory 1120. The memory 1120 is a non-transitory computer-readable medium or device connected to the processor 1110, and stores instructions that, when executed by the processor 1110, cause the processor 1110 to perform any one or any combination of any two or more of the operations described herein. The memory 1120 also stores data to be processed by the processor 1110 and data that has already been processed by the processor 1110. In one example, the memory 1120 includes either one or both of a high-speed random access memory (RAM) and a nonvolatile computer-readable storage memory, for example, at least one disk storage device and flash memory device, and other nonvolatile solid-state memory devices.

The processor 1110 is configured to execute instructions to perform any one or any combination of any two or more of the operations described above with reference to FIGS. 1 through 10. In one example, the processor 1110 is configured to obtain a facial image of a 3D face of a user, determine an occluded region in the facial image by comparing the captured facial image and an average facial image, generate a synthetic image by synthesizing the captured facial image and the average facial image based on the occluded region, and verify the user based on the generated synthetic image. The processor 1110 is further configured to determine at least one of a ratio or a position of the occluded region in the facial image. The processor 1110 is further configured to determine a reliability of the facial image based on the at least one of the ratio or the position of the occluded region, and verify the user based on the determined reliability of the facial image.

Figure 12:
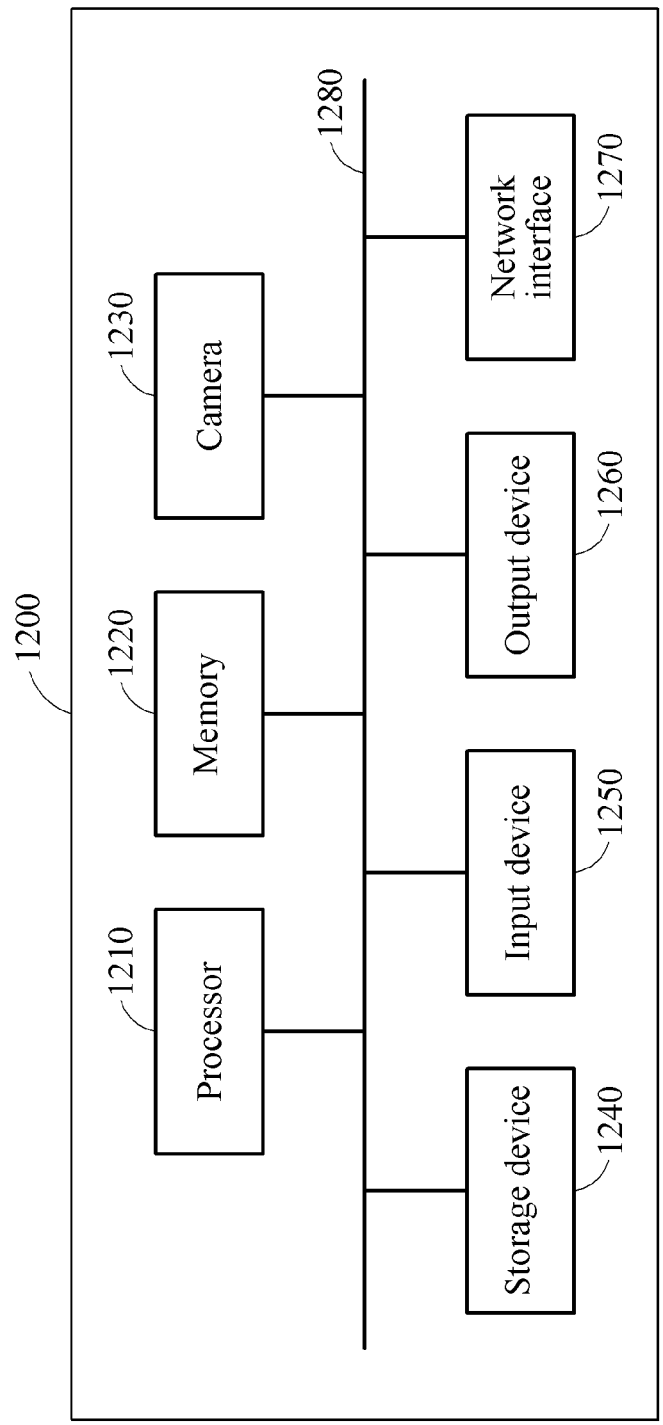
FIG. 12 is a diagram illustrating an example of an electronic apparatus in accordance with one or more embodiments.

FIG. 12 is a diagram illustrating an example of an electronic apparatus.

Referring to FIG. 12, an electronic apparatus 1200 performs a facial verification process by capturing an image of a face of a user and comparing facial features extracted from the captured image and preregistered facial features. The electronic apparatus 1200 may correspond to the electronic apparatus 120 illustrated in FIG. 1 and the facial verification apparatus 1100 illustrated in FIG. 11 in terms of functionality, but is not limited thereto.

The electronic apparatus 1200 includes a processor 1210, a memory 1220, a camera 1230, a storage device 1240, an input device 1250, an output device 1260, a network interface 1270, and a communication bus 1280. The processor 1210, the memory 1220, the camera 1230, the storage device 1240, the input device 1250, the output device 1260, and the network interface 1270 may communicate with each other through the communication bus 1280.

The processor 1210 executes instructions to perform the functions of the software and the applications. For example, the processor 1210 is configured to execute instructions stored in the memory 1220 or the storage device 1240 to perform any one or any combination of any two or more of the operations described above with reference to FIGS. 1 through 11.

The memory 1220 is a non-transitory computer-readable medium or device. The memory 1220 stores the instructions that are executed by the processor 1220 to enable the electronic apparatus 1200 to run the software and the applications. For example, the memory 1220 stores the instructions that, when executed by the processor 1210, cause the processor 1210 to perform any one or any combination of any two or more of the operations described above with reference to FIGS. 1 through 11. The memory 1220 also stores information or data to be processed and data or information that has already been processed by the software and the applications being run by the electronic apparatus 1200.

The camera 1230 may capture a still image, a video image, or both. The camera 1230 obtains or captures an image of a facial region of a user to be used for the user to attempt facial verification. The camera 1230 provides a 3D image including depth information of objects.

The storage device 1240 is a non-transitory computer-readable medium or device. The storage device 1240 stores a database including information, for example, a registered image or registered features, obtained in a facial registration process. In one example, the storage device 1240 stores a greater amount of information and stores the information for a longer period of time than the memory 1220. In one example, the storage device 1240 includes, for example, magnetic hard disks, optical discs, flash memories, floppy disks, or other forms of nonvolatile memory that are known in the technical field of application.

The input device 1250 may receive an input from a user through a traditional input method using an input device such as a keyboard or a mouse, and through a new input method such as a touch input method, a voice input method, and an image input method. Examples of the input device 1250 include a keyboard, a mouse, a touchscreen, a microphone, and other devices configured to detect an input from a user and transmit the detected input to the processor 1210 through the communication bus 1280.

The output device 1260 may provide a user with an output of the electronic apparatus 1200 through a visual, auditory, or tactile channel. Examples of the output device 1260 include a display, a touchscreen, a speaker, a vibration generator, and other devices configured to provide an output to a user. The network interface 1270 communicates with an external device through a wired or wireless network.

The facial verification apparatus 120, and other apparatuses, the processor 1110, the memory 1120, the database 1130, the processor 1210, the memory 1220, the camera 1230, the storage device 1240, the input device 1250, the output device 1260, the network interface 1270, and devices, and other components described herein with respect to FIGS. 1-12 are, and are implemented by, hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated and discussed with respect to FIGS. 1-12 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations performed by the hardware components and the methods as described above. In one example, the instructions or software include machine code that is directly executed by one or more processors or computers, such as machine code produced by a compiler. In another example, the instructions or software include higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, as non-limiting blue-ray or optical disk storage examples, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A mobile verification apparatus comprising:
   a camera configured to capture a three-dimensional (3D) image;
   a processor configured to:
   obtain a facial image including a 3D face of a user based on the 3D image,
   determine an occluded region in the facial image by comparing the facial image and a target facial image, determine a reliability of the facial image based on the occluded region in the facial image, and verify the user based on the determined reliability of the facial image, wherein the processor is further configured to:

extract features from the facial image to perform a facial verification using a landmark detection based on a neural network model, and terminate the verifying using the facial image without extracting features from the facial image based on the reliability of the facial image.

2. The mobile verification apparatus of claim 1, wherein the processor is further configured to extract features from the facial image to perform the verifying in response to the reliability of the facial image being greater than a threshold value.

3. The mobile verification apparatus of claim 2, wherein the processor is further configured to terminate the verifying using the facial image without extracting features from the facial image in response to the reliability of the facial image being less than the threshold value.

4. The mobile verification apparatus of claim 1, wherein the processor is further configured to terminate the verifying based on an amount of a facial landmark covered by an occluding element in the facial image.

5. The mobile verification apparatus of claim 4, wherein the occluding element comprises at least one of a hat, a scarf, and a mask.

6. The mobile verification apparatus of claim 1, wherein the target facial image corresponds to a face of the user.

7. The mobile verification apparatus of claim 1, wherein the processor is further configured to determine the reliability of the facial image based on at least one of a ratio of the occluded region in the facial image and a position of the occluded region in the facial image.

8. The mobile verification apparatus of claim 7, wherein the ratio of the occluded region is determined based on at least one of a ratio of a size of the occluded region to a size of the facial image, and a ratio of a number of landmarks included in the occluded region to a number of landmarks included in the facial image.

9. The mobile verification apparatus of claim 7, wherein the position of the occluded region is determined based on positions of landmarks included in the facial image.

10. The mobile verification apparatus of claim 1, wherein the processor is further configured to determine the reliability of the facial image based on an amount of a facial landmark covered by an occluding element in the facial image.

11. The mobile verification apparatus of claim 10, wherein the occluding element comprises at least one of a hat, a scarf, and a mask.

12. An electronic apparatus comprising:

a processor configured to:

obtain a facial image including a 3D face of a user;

determine an occluded region in the facial image by comparing the facial image and a target facial image;

determine a reliability of the facial image based on the occluded region in the facial image; and verify the user based on the determined reliability of the facial image, wherein the processor is further configured to:

extract features from the facial image to perform a facial verification using a landmark detection based on a neural network model; and terminate the verifying using the facial image without extracting features from the facial image based on the reliability of the facial image.

13. The electronic apparatus of claim 12, wherein the processor is further configured to extract features from the facial image to perform the verifying in response to the reliability of the facial image being greater than a threshold value.

14. The electronic apparatus of claim 13, wherein the processor is further configured to terminate the verifying using the facial image without extracting features from the facial image in response to the reliability of the facial image being less than the threshold value.

15. The electronic apparatus of claim 12, wherein the processor is further configured to terminate the verifying based on an amount of a facial landmark covered by an occluding element in the facial image.

16. The electronic apparatus of claim 15, wherein the occluding element comprises at least one of a hat, a scarf, and a mask.

17. A facial verification method comprising:

capturing a three-dimensional (3D) image;

obtaining a facial image including a 3D face of a user based on the 3D image;

determining an occluded region in the facial image by comparing the facial image and a target facial image;

determining a reliability of the facial image based on the occluded region in the facial image; and verifying the user based on the determined reliability of the facial image, wherein the verifying comprising:

extracting features from the facial image to perform a facial verification using a landmark detection based on a neural network model, and terminating the verifying using the facial image without extracting features from the facial image based on the reliability of the facial image.

18. The facial verification method of claim 17, wherein the extracting comprises extracting features from the facial image to perform the verifying in response to the reliability of the facial image being greater than a threshold value, and wherein the terminating comprises terminating the verifying using the facial image without extracting features from the facial image in response to the reliability of the facial image being less than the threshold value.

19. The facial verification method of claim 17, wherein the terminating comprises terminating the verifying based on an amount of a facial landmark covered by an occluding element in the facial image, and wherein the occluding element comprises at least one of a hat, a scarf, and a mask.

20. A non-transitory computer-readable storage medium storing instructions that, when executed by a processor, cause the processor to perform the facial verification method of claim 17.

* * * * *